United States Patent Office 3,410,658
Patented Nov. 12, 1968

3,410,658
CYANOGEN AZIDE, COMPOSITIONS CONTAINING THIS COMPOUND, AND THE PREPARATION OF THE SAME FROM CYANOGEN HALIDES AND METAL AZIDES
Frank Dennis Marsh, Wilmington, Del., assignor to E. I. du Pont de Nemours and Company, Wilmington, Del., a corporation of Delaware
No Drawing. Filed Aug. 9, 1962, Ser. No. 215,800
24 Claims. (Cl. 23—204)

ABSTRACT OF THE DISCLOSURE

Cyanogen azide, $NCN_3$, liquid solutions of the compound, e.g., in a cyanogen halide, compositions containing the compound adsorbed on adsorption agents, e.g., diatomaceous earth, and the preparation of the compound from reaction between a cyanogen halide, e.g., cyanogen chloride, and a metal azide, e.g., sodium azide, at around room temperature. Cyanogen azide can be used as a blowing agent or to prepare cyanamide.

Field and background of the invention

This invention relates to, and has as its principal objects provision of, cyanogen azide, a method of preparing the same, solutions of the compound in selected solvents and means for storing the azide.

Warning: Cyanogen azide is explosive when free or nearly free of solvent and should then be handled with great care. It can be used, however, with comparative safety in dilute or moderately concentrated solution.

Cyanogen azide, which has the molecular formula $CN_4$ and the principal resonance-hybrid structures

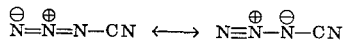

is a compound not prepared heretofore. Darzens [Compt. rend. 154, 1232 (1912)] synthesized a product of the empirical formula $CN_4$ from cyanogen bromide and sodium azide in water and identified it as "carbon pernitride." Hart [J. Am. Chem. Soc. 50, 1922 (1928)] reported that Darzens' product is "dicyandiazide"

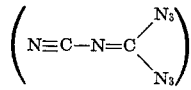

having a molecular weight of 136 and the molecular formula $C_2N_8$.

Details of the invention

Cyanogen azide, $NCN_3$, has now been prepared in readily usable form in nonaqueous media by reaction of a cyanogen halide with an azide salt, i.e., a metal or ammonium salt of hydrazoic acid. The reaction can be represented by the equation

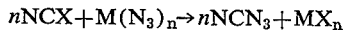

wherein X is halogen (fluorine, chlorine, bromine or iodine), M is a metal or an ammonium, including organoammonium, group, n is the valence of M, and $N_3$ is the azide group. The compound has also been isolated in essentially pure form and stored adsorbed on solid absorbents.

Cyanogen azide is a colorless, unstable liquid. Since it is explosively sensitive to heat or shock it cannot be isolated and purified by distillation or by other conventional means with safety. It can, however, be isolated in essentially pure form with some danger as shown in Example I below. On the other hand, solutions of cyanogen azide are not explosive. Solutions of $NCN_3$ are part of this invention and afford useful means of safely storing, analyzing and processing the product. As noted above, the compound can also be stored adsorbed on a solid adsorbent such as diatomaceous earth, alumina, charcoal, silica gel, and the like and the resultant compositions are not explosive. Cyanogen azide is chemically reactive with olefinically unsaturated compounds, and this reactivity provides a method for its analytical determination in solution, e.g., by reaction with bicyclo[2.2.1]hept-2-ene (norbornene) and isolation of the resultant stable derivative.

Any metal azide salt can be used to prepare cyanogen azide from any of the cyanogen halides according to the equation given above. The more practical metal azides are preferred, such as the azides of the alkali and alkaline earth metals (the metals of Groups I-A and II-A in the periodic table). The preferred metal azides include the azides of lithium, sodium, potassium, cesium, magnesium, calcium and barium. Likewise, any ammonium azide, including organoammonium azides free of reactive subsitutents, can be used. Among the preferred ammonium azides are ammonium azide and hydrocarbon ammonium azides of up to 18 carbons, e.g., monoalkylammonium azides, dialkylammonium azides, trialkylammonium azides, quaternary ammonium azides in which the quaternary ammonium group is tetraalkyl or trialkylaralkyl, and heterocyclic ammonium azides such as pyridinium azide and quinolinium azide.

The reaction of a cyanogen halide, e.g., cyanogen chloride, with a metal azide or an ammonium azide, e.g., sodium azide, occurs readily at temperatures in the range of about $-50°$ C. to about $+25°$ C., i.e., room temperature. Although the reaction also proceeds at temperatures above room temperature, it is preferred not to exceed about 40 or $50°$ C. to avoid loss of cyanogen azide by decomposition and for safety. Although the reaction is conveniently carried out at atmospheric pressure, higher or lower pressures can be used if desired.

The reaction is readily accomplished by admixing the reactants, preferably at a controlled rate in a suitable medium with agitation and temperature control. The cyanogen halide can be added to an excess of the azide salt or vice versa. The mixing can also be accomplished by simultaneous addition of both reactants in near equivalent proportions.

Since cyanogen azide is miscible with any of the cyanogen halides in the liquid state, it is especially convenient to carry out the preparation in an excess of liquefied cyanogen halide, which then acts also as the reaction medium. Solutions thus obtained of cyanogen azide in liquid cyanogen halides are convenient for its safe storage, for its further use in chemical reactions, and for its transfer into other solvents. If it is desired to obtain solvent-free or highly concentrated cyanogen azide, it is convenient to use liquefied cyanogen fluoride or cyanogen chloride in the dual role of reactant and reaction medium. Excess of these cyanogen halides can be removed to any extent desired by evaporation or low temperature distillation. The insoluble metal halide by-product is preferably removed before-hand by filtration from the reaction mixture, but the metal halide is frequently not separated when its presence is harmless to subsequent reactions of the cyanogen azide. In variations of the procedure wherein excess cyanogen halide serves as the reaction medium, measured quantities of other solvents can be added to produce solutions of any desired concentration.

Organic solvents can be used as reaction media in the preparation of cyanogen azide. However, compounds having aliphatic unsaturation react readily with cyanogen azide and normally are not suitable as reaction media; and the presence of water in the synthesis process allows rapid formation of "dicyandiazide" (Hart, loc. cit.) which occurs in the co-presence of a cyanogen halide and aqueous azide ion. It is unnecessary that the medium be a solvent for the azide salt, since the reaction can proceed in a medium, such as pentane, in which metal azides are essentially insoluble; but it is important that cyanogen azide be soluble in the medium. The exothermic reaction is generally slow in a medium in which the metal azides have poor solubility, e.g., in benzene, pentane or excess cyanogen halide. In a medium wherein the metal azides have appreciable solubility, e.g., in acetonitrile, ethyl acetate or ethanol, the reaction is rapid and may become vigorous, so that particular attention to control of mixing rate and temperature is required. For safety in operations under ordinary conditions, it is usually preferred that the solvent medium be a liquid having a boiling point above that of the cyanogen halide reactant, more preferably above room temperature, so that evaporation of both the unreacted halide and the solvent will not occur and leave residual cyanogen azide in such high concentration that it is an explosion hazard.

The presence of water in a reaction mixture containing a cyanogen halide and an azide salt prevents formation of a cyanogen azide, since the product termed "dicyandiazide" is formed instead. However, cyanogen azide is relatively stable toward water in the absence of an azide salt, and the presence of water is therefore not precluded in mere solutions of cyanogen azide (see Example XVI, below). Since cyanogen azide has limited solubility in water along, dilute aqueous solutions only can be handled with safety.

In general, any of the common organic solvents free of aliphatic unsaturation can be employed as media in the preparation of cyanogen azide, or as solvents in its storing and handling. Such solvents include aromatic and saturated aliphatic hydrocarbons and halohydrocarbons, alcohols, ethers, esters (including carboxylates, carbonates, sulfates, sulfonates, phosphates, phosphonates, borates, and silicates), carboxylic acids, aldehydes, ketones, acetals, ketals, nitriles, nitrohydrocarbons, amides (particularly N,N-dialkyl-substituted amides), sulfides, sulfoxides, sulfones and silicones.

Solutions of cyanogen azide are conveniently obtained directly in the synthesis process when using a solvent as the reaction medium, or they can be prepared by taking up solvent-free or highly concentrated cyanogen azide in the solvent. Cyanogen azide is miscible with all common organic solvents under ordinary conditions of temperature and pressure. In fact, on the basis of experience with a variety of uncommon solvents, e.g., liquid perfluorocarbons, it is believed there is no known organic solvent in which it is completely insoluble. Accordingly, solutions containing cyanogen azide in the widest range of concentrations, e.g., from 1 to 99 percent, are normally obtainable. For practical purposes, however, and especially for safety, solutions having concentrations in the range of 10 to 50 percent are recommended. Such solutions can be used in carrying out reactions of cyanogen azide. They are stable for several days at room temperature, and can be stored indefinitely at low temperature, i.e., at about 0° C. or below. The temperature of storage should not be so low as to cause the solvent to solidify or otherwise reduce the solubility of cyanogen azide so that it separates as a substantially solvent-free, shock-sensitive second phase. Preferred storage temperatures are $-30$ to $0°$ C.

Solvents that react rapidly with cyanogen azide, e.g., olefinic compounds, cannot be used in the preparation of cyanogen azide per se, since secondary reaction with the reactive solvent will take place as cyanogen azide is formed and the ultimate product is that derived from the secondary reaction. If it is intended to prepare the secondary product it is convenient to use the secondary reactant as the solvent medium in which the metal azide and the cyanogen halide react to form cyanogen azide in situ. Although many solvents other than those having aliphatic unsaturation are completely unreactive with cyanogen azide under all practical conditions, i.e., conditions under which cyanogen azide does not undergo self-decomposition, some solvents may react slowly even at room temperature and sometimes readily at higher temperatures. But generally speaking, such slow reactive solvents are essentially inert toward cyanogen abide in the presence of a vigorous reactant, such as bicyclo[2.2.1]hept-2-ene. All of these solvents can be used within the practical range of temperatures that are suitable for the preparation of cyanogen azide, i.e., in the range of about $-50$ to $+50°$ C. Many, though not all, of these solvents can be used without reservation throughout this whole temperature range; and all are essentially nonreactive with cyanogen azide in the preferred storage temperature range of $-30$ to $0°$ C.

Embodiments of the invention

The invention is illustrated in greater detail in the following nonlimiting examples. In these examples, all pressures are atmospheric unless otherwise indicated.

EXAMPLE I

Preparation of pure cyanogen azide

A 100 ml. flask equipped with a magnetic stirrer, wet ice condenser, gas inlet tube and nitrogen bubbler was flame dried and cooled under nitrogen. The flask was then placed in an acetone-solid carbon dioxide bath and charged with cyanogen chloride (34 g., 0.55 g. mole, dried over calmium chloride), pentane (19 g., 0.26 g. mole, dried over sodium) and sodium azide (3.25 g., 0.05 g. mole, sieved through 60 mesh screen). The mixture was stirred for 40 hours under nitrogen at room temperature and excess cyanogen chloride was evaporated. The resultant slurry was filtered under nitrogen and the filter cake washed with a little acetone.

Sodium azide was completely converted to sodium chloride, as indicated by a negative test for azide ion and a positive test for chloride ion on the solid product. Distillation of the combined filtrate and acetone washings at less than 1 mm. pressure at room temperature yielded a small amount of brown residue and a colorless distillate collected by condensation in a trap cooled in an acetone-solid carbon dioxide bath. Removal of excess acetone and pentane from this distillate at room temperature and atmospheric pressure by means of flowing nitrogen as a carrier gave a colorless residual oil, which was essentially solvent-free cyanogen azide and which detonated sharply when tested in a flame.

Analysis for $CN_4$, mol. wt.—Calc'd: 68. Found: 68 (mass spectroscopy), 68.7 (freezing point in benzene). Infrared analysis of this product showed absorption in the 4.5 to $4.8\mu$ and $8\mu$ regions, indicative of cyanogen azide. Reduction of an ether solution of this oil with hydrogen sulfide gave sulfur and cyanamide, the latter being identified by comparison of its infrared spectrum with that of a known sample.

EXAMPLE II

Cyanogen azide in cyanogen chloride

A 100 ml. flask equipped with a magnetic stirrer, wet ice condenser, gas inlet tube, and nitrogen bubbler was flame-dried and cooled under nitrogen. The flask was then placed in an acetone-solid carbon dioxide cooling bath and cyanogen chloride (20 ml., 24.2 g., 0.39 g. mole, dried over calcium chloride) and sodium azide (3.25 g., 0.05 g. mole, sieved through 60 mesh screen) were added. After the mixture was stirred for 21 hrs. at room temperature under nitrogen, a negative test for azide ion on the white salt which separated indicated that the sodium azide was completely consumed. The supernatant light tan solution was estimated to contain about 14% by weight of cyanogen azide in cyanogen chloride.

The flask was cooled in ice water and excess cyanogen chloride was removed from the solution under reduced pressure (182 mm.). The residual semi-solid product, which contained by-product sodium chloride, was diluted with 50 ml. of dry ether, and excess hydrogen sulfide was then added slowly for 1½ hrs. at ice temperature and finally for 40 min. at room temperature. The ether solution was then filtered and the filtrate evaporated to dryness under reduced pressure. The crystalline residue was dissolved in water, and the solution was warmed in a steam bath and filtered to remove traces of sulfur. Evaporation of the filtrate to dryness at about 0.5 mm. pressure gave 1.5 g. (72% yield) of pure crystalline cyanamide, which was identified by comparison of its infrared spectrum with that of an authentic sample. Sublimation of an aliquot of this material gave product melting at 46–47° C. The melting point was not depressed when the sublimate was mixed with an authentic sample of cyanamide.

Analysis for $CH_2N_2$. Calcd.: C. 28.56; H. 4.80; N, 66.63. Found: C, 28.60; H. 4.74; N, 66.58, 66.84.

EXAMPLE III

Cyanogen azide in acetonitrile

Activated sodium azide (9.75 g., 0.15 g. mole) and acetonitrile (53 ml., 40.8 g., 1 g. mole) were added to a 125 ml. flame-dried flask equipped with a reflux condenser, magnetic stirrer, gas inlet tube and nitrogen bubble. The flask was cooled under nitrogen to −4° C., and with the condenser at −10° C. gaseous cyanogen chloride (15 ml., 18 g., 0.29 g. mole) was added at such a rate as to keep the temperature of the reaction mixture below 16° C. When addition was complete the mixture was allowed to warm to room temperature, and stirring was continued for 20 hours. Excess cyanogen chloride was removed under reduced pressure (120 mm.) and the residual solution filtered. The filter cake was washed with a little acetonitrile, and the filtrates were combined to give 74 ml. of light brown solution which showed the characteristic infrared absorption for cyanogen azide. The solution was estimated to contain about 17% by weight of cyanogen azide.

In other preparations by this procedure in which the proportional amount of acetonitrile was varied, stable solutions were obtained containing up to 50% by weight of cyanogen azide.

Activated sodium azide is prepared as follows:

Hydrazine hydrate (10 ml.) is added with stirring to a solution of 70 g. of commercial sodium azide in 280 ml. of distilled water. The mixture is stirred 15 minutes at room temperature, and is then filtered into 3 liters of acetone with stirring. The acetone slurry is filtered in an atmosphere of nitrogen, and the powdery sodium azide thus separated is dried for 1–2 hours at 40–50° C. under vacuum.

EXAMPLE IV

Cyanogen azide in cyanogen chloride with norbornene for assay

To a 300 ml. flame-dried flask equipped with a magnetic stirrer, wet ice condenser, gas inlet tube and nitrogen bubbler was added sodium azide (19.5 g., 0.3 g. mole, 98.3% purity, sieved through 60 mesh screen), and bicyclo [2.2.1.] hept-2-ene (norbornene, 50 g., 0.54 g. mole). The flask was cooled in an acetone-solid carbon dioxide bath and cyanogen chloride (80 ml., 115 g., 1.87 g. mole) was introduced. The mixture was allowed to warm to reflux temperature (ca. 16–20° C.) with stirring, and after 20 hrs. was warmed to 55° C. to remove excess cyanogen chloride. The residue was diluted with 50 ml. of acetone and filtered. Removal from the filtrate of acetone and excess bicyclo [2.2.1] hept-2-ene at 0.3 mm. at 50° C. on a rotary evaporator gave 39.8 g. (99% yield) of residual product which was identified as a mixture of isomeric derivatives, 3-azatricy-clo[3.2.1.0/$^{204}$]-octane-3-carbonitrile and bicyclo[2.2.1.]-heptan-2-cyanoimine. Distillation of this material in a short path still gave 34.4 g. (86% yield) of refined product having a refractive index of 1.5147 at 25° C. and a molecular weight of 134 by mass spectrographic analysis.

The infrared spectum of the above-described isomeric mixture was identical with that of an analytical sample prepared in another experiment (B.P. 70–72° C./0.26 mm.; $nD^{25}$ 1.5142). The analytical sample contained about 80% of the azatricyclooctane isomer.

Analysis for $C_8H_{10}N_2$. Calc'd: C, 71.60; H, 7.51; N, 20.9; M.W. 134.19. Found; C, 71.64; H, 7.77; N, 20.77; M.W. 131.133.

EXAMPLE V

Cyanogen azide in ethyl acetate

To a 50 ml. flask equipped with a magnetic stirrer, reflux condenser, thermometer, dropping funnel, gas inlet tube and nitrogen bubbler was added activated sodium azide (3.25 g., 0.05 mole) and 20 ml. of ethyl acetate. The flask was placed in an ice-salt bath, and cyanogen chloride (5 ml., 4.2 g., 0.068 g. mole) was added with stirring at such a rate to keep the temperature below +6° C. After completion of the cyanogen chloride addition stirring was continued, and the mixture was allowed to warm to room temperature and remain there for one hour. The mixture, the liquid portion of which was estimated to contain about 18% by weight of cyanogen azide dissolved in ethyl acetate, was again cooled in an ice-salt bath, and bicyclo [2.2.1] hept-2-ene (7.05 g., 0.05 g. mole) dissolved in 10 ml. of ethyl acetate was added in 40 minutes while the reaction temperature was held below +12° C. After standing overnight, during which nitrogen was evolved, the reaction mixture was filtered and the solvent removed from the filtrate on a rotary evaporator. The residual light straw-colored oil weighted 6.7 g. (0.05 g. mole, 100% yield) and had an infrared absorption pattern identical with that of the product of Example IV.

Data for additional examples of the preparation of cyanogen azide from various cyanogen halides and azide salts in a number of representative reaction media are presented in Table I. The procedure in these examples is like that of Example V, the cyanogen azide being identified and assayed by isolation of its bicyclo [2.2.1.] hept-2-ene derivative.

TABLE I

| Example | Cyanogen Halide | Azide Salt | Reaction Medium | Bicyclo[2.2.1]Hept-2-Ene Derivative, Percent Yield |
| --- | --- | --- | --- | --- |
| VI | ClCN | NaN₃ | Benzene | 91 |
| VII | ClCN | NaN₃ | s-Tetrachloroethane | 92 |
| VIII | ClCN | NaN₃ | Ethanol | 100 |
| IX | ClCN | NaN₃ | Dimethylformamide | 91 |
| X | FCN | NaN₃ | Acetonitrile | 99 |
| XI | BrCN | NaN₃ | do | 99 |
| XII | ClCN | LiN₃ | do | 86 |
| XIII | ClCN | NH₄N₃ | do | 83 |
| XIV | ClCN | NaN₃ | Acetone | 100 |
| XV | ClCN | NaN₃ | 1,2-dimethoxyethane | 99 |

EXAMPLE XVI

Stability of cyanogen azide to water

Cyanogen azide was prepared by stirring activated sodium azide (6.5 g., 0.1 g. mole) with an excess of cyanogen chloride (60 ml.) at 10–16° C. for 20 hours. Ether (50 ml.) was added, the mixture was evacuated to remove some of the excess cyanogen chloride, and the concentrated ethereal solution was filtered. The filtrate was mixed with 25 ml. of water, and the mixture was stirred at room temperature under vacuum (ca. 25 mm.) to remove the ether and remaining chloride while maintaining contact of the cyanogen azide with water. The final mixture, which was stirred for a total of 17 hours at room temperature, was not homogeneous, indicating limited solubility of cyanogen azide in water, i.e., a solubility of less than 27 g. in 100 g. of water, which is the estimated proportion in the mixture.

The aqueous mixture was extracted with ether, and the extract was dried over anhydrous magnesium sulfate. The dried solution was cooled in an ice bath, and 9.9 g. (0.105 g. mole) of bicyclo[2.2.1]hept-2-ene (i.e., norbornene) dissolved in 25 ml. of ether was added over a period of 1 hour. The stirred mixture was allowed to warm slowly to room temperature, and was held an additional hour at room temperature. The ethereal reaction mixture was finally freed of solvent and excess norbornene in a rotary evaporator at 50° C. and 0.1 mm. pressure. The residual light tan oil, obtained in 9.9 g. (75% of the theoretical) yield, was identified by its infrared absorption spectrum as the norbornene-cyanogen azide derivative.

EXAMPLE XVII

Cyanogen azide on "Celite"

A solution containing about 4.8 g. (0.07 g. mole) of cyanogen azide in about 15 ml. of acetonitrile was mixed with 6.8 g. of "Celite" (Johns-Manville L665–A; "Celite" is a trade name of the Johns-Manville Corporation for diatomaceous earth products), and the resultant wet solid was reduced to a free-flowing powder under vacuum in a rotary evaporator. A slurry of the powder in 20 ml. of ether was cooled to 0° C., and 9.0 g. (0.096 g. mole) of norbornene dissolved in 20 ml. of ether was added slowly with stirring. The mixture was stirred and allowed to warm slowly to room temperature, and was held at room temperature until evolution of nitrogen had ceased. The slurry was then filtered, the filter cake was washed with 50 ml. of acetone, and the filtrate concentrated to a light tan residual oil at 50° C. and 0.1 mm. pressure. The oil, identified by infrared analysis as the norbornene-cyanogen azide derivative, weighed 7.0 g. This yield is equivalent to 0.052 g. mole or 3.53 g. of cyanogen azide, and demonstrates that the free-flowing powder contained a minimum of about 34 percent by weight of absorbed cyanogen azide.

EXAMPLE XVIII

Cyanogen azide on alumina

A solution containing about 4.8 g. (0.07 g. mole) of cyanogen azide in about 15 ml. of acetonitrile was mixed with 6.4 g. of alumina (Woelm: neutral, activated grade 1), and the resultant mixture was reduced to a free-flowing powder under vacuum in a rotary evaporator. The powder was treated with 9 g. (0.096 g. mole) of norbornene in ether by the procedure described in Example XVII. The derivative weighted 4.5 g. Based on this yield the free-flowing alumina mixture is calculated to have contained about 24.5 percent by weight of cyanogen azide.

In the manner of the foregoing examples, cyanogen azide or solutions of cyanogen azide can be prepared from any of the cyanogen halides, i.e., cyanogen fluoride, cyanogen chloride, cyanogen bromide or cyanogen iodide, and any metal azide or organoammonium azide having nonreactive substituents. Besides the alkaline and alkaline earth azides other well known azides can be used, e.g., silver, lead, mercurous, cuprous, ferrous and ferric azide, but their use is less preferred because of their known explosiveness. Representative nonhazardous organoammonium azides that can be used are: butylammonium azide, diethylammonium azide, trimethylammonium azide, tetramethylammonium azide, phenylammonium azide, benzylammonium azide, and benzyltrimethylammonium azide.

Representative organic solvents that can be used either as reaction media in the process or for the preparation of spontaneously nonexplosive solutions of cyanogen azide include n-octane, isooctane, n-decane, n-dodecane, cyclohexane, toluene, p-xylene, tetrahydronaphthalene, decahydronaphthalene, methylene chloride, carbon tetrachloride, 1,2-dibromoethane, bromocyclohexane, chlorobenzene, perfluoro(dimethylcyclobutane), isopropyl alcohol, isoamyl alcohol, 1-decanol, diethyl ether, 1,2-dimethoxyethane, 2-ethoxyethanol, amyl acetate, methyl hexoate, methyl benzoate, diethyl sulfate, isopropyl benzenesulfonate, tricresyl phosphate, diethyl borate, ethyl silicate, acetic acid, caproic acid, lauric acid, acetone, cyclohexanone, diethyl formal, 2,2-dimethoxypropane, propionitrile, isobutyronitrile, 1-octanecarbonitrile, 1-dodecanecarbonitrile, benzonitrile, 2-acetoxypropionitrile, nitromethane, nitrobenzene, dimethyl sulfide, octafluorodithiane, dimethyl sulfoxide, and diethyl sulfone.

As demonstrated in Example I, above, solutions of cyanogen azide are useful for reaction with hydrogen sulfide to produce cyanamide, a product having well-known utility.

Cyanogen azide is also useful as a low-temperature blowing agent for polymeric materials, e.g., by dispersing a solution of the azide in the polymer and heating the mixture at 50–70° C. to bring about controlled evolution of nitrogen. Solid compositions containing absorbed cyanogen azide can likewise be used in making blown polymers containing the solid adsorbents as fillers, e.g., by mixing the solid composition in the polymer and heating, and also in the preparation of useful derivatives, e.g., cyanamide. The use of cyanogen azide as a blowing agent is illustrated in the following examples.

Example A

A mixture of 3.1 g. of polyvinyl chloride ("Geon–121") and 11.9 g. of dioctyl phthalate was stirred at room temperature to form a smooth plastisol. A solution of 0.29 g. of cyanogen azide in 0.7 ml. of ethyl acetate was blended into the plastisol, and the mixture was heated from 45° to 130° C. over a period of about one hour in a gradually ascending temperature program. A foam was formed, which was cooled rapidly to yield a stable, pliable, finely-structured, porous mass having a volume approximately 15 times that of the original plastisol.

Example B

A plastisol containing 3.1 g. of polyvinyl chloride and 1.9 g. of dioctyl phthalate was thoroughly mixed with 0.5 g. of diatomaceous earth containing 0.29 g. of absorbed cyanogen azide (cf. Example XVII). Heating the mixture from 45° to 130° C. over a period of about one hour produced a foamed mass which, at room temperature, was rather stiff and somewhat more dense than the product of Example A.

Since obvious modifications and equivalents in the invention will be evident to those skilled in the chemical arts, I proposed to be bound solely by the appended claims.

The embodiments of the invention in which an exclusive property or privilege is claimed are defined as follows:

1. Cyanogen azide having the formula $NCN_3$.
2. A solution of the compound of claim 1 in a liquid free from aliphatic unsaturation.
3. A solution of the compound of claim 1 in cyanogen chloride.
4. A solution of the compound of claim 1 in a saturated hydrocarbon.

5. A solution of the compound of claim 1 in an aromatic hydrocarbon.

6. A solution of the compound of claim 1 in acetonitrile.

7. A solution of the compound of claim 1 in ethyl acetate.

8. A solution of the compound of claim 1 in s-tetrachloroethane.

9. A solution of the compound of claim 1 in ethanol.

10. A solution of the compound of claim 1 in dimethyl formamide.

11. The compound of claim 1 absorbed on a solid inert carrier.

12. The compound of claim 1 absorbed on diatomaceous earth.

13. The compound of claim 1 absorbed on alumina.

14. The process of preparing cyanogen azide having the formula $NCN_3$, which comprises reacting a cyanogen halide with a member of the group consisting of metal, ammonium and organoammonium azides under anhydrous conditions.

15. The process of claim 14 accomplished in a non-aqueous liquid reaction medium selected from the group consisting of cyanogen chloride and hydrocarbons, halohydrocarbons, hydrocarbon nitriles, hydrocarbon esters and hydrocarbon alcohols free of nonaromatic unsaturation.

16. The process of preparing the compound of claim 1 which comprises reacting a cyanogen halide with an alkali metal azide in a liquid hydrocarbon at a temperature of about —50 to +50° C. under anhydrous conditions.

17. The process of preparing the compound of claim 1 which comprises reacting a cyanogen halide with an alkali metal azide at a temperature of about —50 to +50° C. in anhydrous pentane.

18. The process of preparing the compound of claim 1 which comprises reacting a cyanogen halide with an alkali metal azide at a temperature of about —50 to +50° C. in anhydrous acetonitrile.

19. The process of preparing the compound of claim 1 which comprises reacting a cyanogen halide with an alkali metal azide at a temperature of about —50 to +50° C. in anhydrous ethyl acetate.

20. The process of preparing the compound of claim 1 which comprises reacting a cyanogen halide with an alkali metal azide at a temperature of about —50 to +50° C. in anhydrous benzene.

21. The process of preparing the compound of claim 1 which comprises reacting a cyanogen halide with an alkali metal azide at a temperature of about —50 to +50° C. in anhydrous s-tetrachloroethane.

22. The process of preparing the compound of claim 1 which comprises reacting a cyanogen halide with an alkali metal azide at a temperature of about —50 to +50° C. in anhydrous ethanol.

23. The process of preparing the compound of claim 1 which comprises reacting a cyanogen halide with an alkali metal azide at a temperature of about —50 to +50° C. in anhydrous dimethyl formamide.

24. A solution of the compound of claim 1 in a cyanogen halide.

References Cited

UNITED STATES PATENTS

| | | | |
|---|---|---|---|
| 1,779,984 | 10/1930 | Schmittnägel | 23—359 |
| 2,391,490 | 12/1945 | Thuraton et al. | 23—359 |
| 720,402 | 2/1903 | Bueb | 23—75 |
| 1,032,988 | 7/1912 | Bueb | 23—75 |
| 1,890,875 | 12/1932 | Zisch | 252—184 |
| 2,414,116 | 1/1947 | Miller | 252—184 |

OTHER REFERENCES

Cotton and Wilkinson: "Advanced Inorganic Chemistry," Interscience Publishers, 1962, p. 56.

Williams: "Cyanogen Compounds," 2nd edition, p. 16, Edward Arnold and Co., London, 1948.

Williams: "Cyanogen Compounds," 2nd edition, pp. 12–13, Edward Arnold and Co., London, 1948.

EDWARD J. MEROS, *Primary Examiner.*

H. S. MILLER, *Assistant Examiner.*